United States Patent Office 3,403,089
Patented Sept. 24, 1968

3,403,089
REPAIRING INSULATION OF ELECTRICAL
CONDUCTORS BY ELECTRODEPOSITION
William H. Joyce, Somerset, N.J., assignor to Union
Carbide Corporation, a corporation of New York
No Drawing. Filed Apr. 5, 1965, Ser. No. 445,788
13 Claims. (Cl. 204—181)

This invention relates to electrical conductors free of insulation defects and to methods of repairing defects in the insulation of insulated electrical conductors.

A common problem encountered with insulated conductive wire used in electrical applications is the presence of defects or breaks in the insulation. Regardless of whether these defects result from imperfect fabrication methods or from physical damage to the insulation afterwards due to bending, cracking, abrasion or other phenomena, these defects must be remedied to prevent arcing, short circuits and the like. Sheathed telephone or power cables containing a plurality of wire conductors are conventionally tested after fabrication by capping off one end of the cable, filling the cable with water, and checking for faults by measuring resistance between the grounded sheath (or a ground inserted into the cable) and each single wire conductor contained within the cable. When faults are discovered they must be located, the cable must be broken open, each fault repaired manually, using tape insulation, injection molded covers, sealing compounds, or other methods well-known in the art, and then the cable jacket resealed. This procedure is tedious, time consuming, and expensive.

It is, therefore, an object of this invention to provide a facile and economical method for testing and repairing insulated electrical conductors in the one operation.

It is another object to provide insulated electrical conductors free of defects in the insulation.

Other objects will be readily apparent to those skilled in the art by a reading of the description of the invention which follows.

It has now been discovered that defects in the insulation of insulated electrical conductors can be repaired by:

(a) contacting the insulated conductor at a point of insulation fault with a bath comprising an admixture of water and a salt of a carboxyl containing $\alpha$-olefin polymer;

(b) connecting said bath to ground;

(c) connecting a direct current source in an electrical circuit containing the insulated conductor, bath and ground, said insulated conductor being connected to the positive side of the direct current source; and (d) applying a voltage of at least about 5.0 volts D.C. for a length of time sufficient to electrodeposit carboxyl containing $\alpha$-olefin polymer on the insulated conductor at a point having less than a predetermined insulation value.

The term "predetermined insulation value" refers to those values well known in the art for various insulated electrical conductors and is determined by standards or specifications set by manufacturers and commercial consumers practicing the art as for example, the American Society for Testing Materials standard tests and the like.

Although not essential, it is preferred to employ as the carboxyl containing $\alpha$-olefin polymers of this invention interpolymers of $\alpha$-olefins having the general formula:

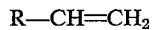

where R is selected from the group consisting of hydrogen and alkyl radicals having up to 10 carbon atoms, the olefin content of said interpolymer being at least 50 mole percent of the total interpolymer and interpolymerized therewith an $\alpha,\beta$-ethylenically unsaturated carboxylic acid having one or more carboxyl groups, said unsaturated carboxylic acid constituting up to about 50 mole percent of the total interpolymer.

However, the present invention is not limited to interpolymers derived from the interpolymerization of an $\alpha$-olefin and an $\alpha,\beta$-ethylenically unsaturated carboxylic acid. The starting polymer used to make the polymer salts used in this invention can also be provided by oxidizing olefinic polymers, such as those described in U.S. 3,155,644, by grafting carboxylic acid containing monomers onto an olefin polymer backbone by methods well known in the graft polymerization art such as the method described in U.S. 2,970,129 which are incorporated herein by reference or by grafting monomers such as carboxylic acid derivatives, i.e., esters, anhydrides, amides, nitriles and the like onto an olefin polymer backbone followed by conversion to free carboxylic acid groups after grafting.

Also included within the purview of this invention are halogenated, carboxyl containing $\alpha$-olefin polymers. The method of introducing the halogen into these polymers is not at all critical and so can be accomplished by first preparing a halogen free interpolymer of, for example, ethylene-acrylic acid and then halogenating that interpolymer by methods well known in the art or by interpolymerizing a halogen containing vinyl monomer with an $\alpha$-olefin and an unsaturated carboxylic acid. A specific example of this latter class of interpolymers is one obtained by interpolymerizing ethylene, vinyl chloride and acrylic acid. Other examples include interpolymers of ethylene-vinylidene chloride-acrylic acid, ethylene-vinyl chloride-methacrylic acid, ethylene-vinylidene chloride-methacrylic acid, ethylene-vinyl bromide-acrylic acid, ethylene-vinyl bromide-methacrylic acid, ethylene-vinyl fluoride-acrylic acid, ethylene-vinyl fluoride-methacrylic acid, ethylene-vinylidene fluoride - acrylic acid, ethylene-vinylidene fluoride-methacrylic acid, ethylene-vinyl iodide-acrylic acid, propylene - vinyl chloride - acrylic acid, propylene-vinyl chloride-methacrylic acid, propylene-vinylidene chloride-acrylic acid, propylene-vinylidene chloride-methacrylic acid and the like.

As indicated above, the $\alpha$-olefins preferably employed in the polymers of this invention are $\alpha$-olefins having the general formula:

$$RCH=CH_2$$

where R is either a hydrogen or an alkyl radical having up to 10 carbon atoms. Thus, suitable $\alpha$-olefins include, ethylene, propylene, butene-1, pentene-1, hexene-1, neohexene, octene-1, nonene-1, decene-1, 3-methylbutene-1, 4-methylpentene-1, 3 - methylhexene-1, 4,4 - dimethylhexene-1 and the like. Although polymers of higher olefins can be used, they are not as commercially available or economical as the lower olefins.

The $\alpha,\beta$-ethylenically unsaturated carboxylic acids used in the polymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as methyl hydrogen maleate, methyl hydrogen fumarate, ethyl hydrogen maleate, ethyl hydrogen fumarate and the like.

The starting polymers used to make the polymer salts of this invention are not limited to two components. Therefore, additional copolymerizable monomers can be employed together with the olefin and carboxylic acid comonomers. The scope of the starting polymers which can be used is exemplified, although not limited by the following interpolymers: ethylene/acrylic acid interpolymers, ethylene methacrylic acid interpolymers, ethylene/itaconic acid interpolymers, ethylene/methyl hydrogen maleate interpolymers, ethylene/maleic acid interpolymers, ethylene/acrylic acid/methyl acrylate interpolymers, ethylene/acrylic acid/ethyl acrylate interpolymers, ethylene/methacrylic acid/methyl methacrylate interpolymers, ethylene/methacrylic acid/ethylmethacrylate interpolymers, ethylene/acrylic acid/methacrylic acrylic acid interpolymers, ethylene/methacrylic acid/methyl acrylate interpolymers, ethylene/acrylic acid/methyl methacrylate interpolymers, ethylene/methyl hydrogen maleate/ethyl acrylate interpolymers, ethylene/acrylic acid/vinyl acetate, ethylene/methacrylic acid/vinyl acetate interpolymers, ethylene/propylene/acrylic acid interpolymers, ethylene/propylene/methacrylic acid interpolymers, ethylene/maleic acid/ethyl vinyl ether interpolymers, ethylene/butene-1/acrylic acid interpolymers, ethylene/neohexene/acrylic acid interpolymers, propylene/acrylic acid interpolymers, butene-1/acrylic acid interpolymers and the like.

The polymer salts used in this invention need not be limited to 2 components, i.e., one α-olefin and one unsaturated carboxylic acid salt moiety. Even when the starting polymer is composed of only 2 components, viz., one α-olefin and one unsaturated carboxylic acid, the resultant salt can have 3 or more components. To cite the concrete case in point, an ethylene/acrylic acid interpolymer can be partly neutralized with sodium hydroxide to afford an interpolymer salt consisting of 3 components, viz., ethylene/acrylic acid, and sodium acrylate polymers. It will be readily apparent to those skilled in the art that polymer salts containing innumerable combinations of α-olefins and unsaturated carboxylic acids, salts and acid derivatives are contemplated within the purview of this invention.

The carboxyl content of the starting olefin polymer is preferably in the range of about 5 to 25 mole percent of the total polymer although contents of about 1 to 50 mole percent can also be employed, if desired. The starting olefin polymer used to make polymer carboxyl salts in this invention should contain sufficient carboxyl groups to permit the formation of at least water-dispersible salts and preferably water-soluble salts. Solubility increases as the carboxyl salt moiety content of the polymer is increased.

The carboxyl salt moiety content of these polymer salts is preferably about 3 to 25 mole percent of the total polymer salt although other ranges can also be employed, if desired. The term "carboxyl salt moiety" includes both the carboxyl anion and the monovalent cation.

The preferred monovalent cations in the polymer salts of this invention are Na+, K+, Li+ and (R)$_3$NH+ wherein each of R is hydrogen or a monovalent hydrocarbon radical containing up to 10 carbon atoms.

The hydrocarbon radical can be an alkyl, cycloalkyl, aryl, alkaryl or aralkyl radical. Suitable alkyl radicals include methyl, ethyl and isopropyl radicals. Representative cycloalkyl radicals include cyclobutyl, cyclopentyl and cyclohexyl radicals. Representative aryl radicals include phenyl and naphthyl radicals. Among the alkaryl and aralkyl radicals which can be used are benzyl, cumyl, tolyl and xylyl radicals.

These polymer carboxyl salts can be prepared by neutralizing the starting carboxyl containing polymer with metal salts, such as carbonates or bicarbonates, metal bases such as hydroxides or alkoxides, tertiary amine bases such as trimethyl ammonium hydroxide, monomethyltriethyl ammonium hydroxide, dimethylphenyl ammonium hydroxide and the like, metal alkyls such as sodium ethyl, butyl lithium and the like, methyl aryls such as phenyl lithium, potassium naphthalene and the like, hydrides of sodium, potassium or lithium, amides of sodium or potassium, oxides such as sodium peroxide, or in the case of alkali metal salts even with the free alkali metal itself. Preferred bases are alkyl ammonium hydroxides, ammonium hydroxide, lithium hydroxide, sodium hydroxide and potassium hydroxide. Any method known in the art can be used to effect this neutralization process. It has been found to be convenient and economical to blend the starting carboxyl containing olefin polymer and a metal base on a two-roll mill, in a Banbury mixer or with similar commercially available mixing equipment.

The concentration of polymer salt in the water-salt bath is not narrowly critical. A preferred range is about 5.0 to 40% solids by weight with about 5% to 20% being particularly preferred. The time required for effecting repair of insulation defects although generally of short duration is not narrowly critical but depends on a multitude of variables such as the area of the defects to be repaired, the number of defects, the distance between the conductor and ground during the electrodeposition, the applied voltage and the like. However, the determination of the minimum time required for any specific case is easily made by observing the time required for the electrical current flow to reach a minimum or conversely the resistance to reach the desired maximum since all relevant variables are integrated into such readings. It is preferred to apply the direct current for at least 0.01 second in this method.

The temperature and pressure used are not critical and so for convenience ambient conditions are preferred, although higher and lower conditions can be used if desired.

The direct current voltages employed in the practice of this invention should be at least about 5 volts D.C. There is no maximum limit other than that imposed by heating effects and the resistance of the insulation used on any particular conductor.

The size and chemical composition of the conductors and the thickness of the insulation around them are not narrowly critical in the practice of this invention. The size, chemical composition or thickness limits are determined not by the repair method itself but by requirements outside the purview of the invention such as the gauge of wire which can be conveniently or practically used in the fabrication of cables containing a plurality of conductors, the conductivity desired and the minimum insulation thickness requirements required to meet a specific set of specifications.

It will be readily apparent to those skilled in the art that this invention affords electrically conductive cables which have in effect been tested and proved to have adequate insulation. They have been tested because in subjecting electrically conducting cables to this defect-repair method any defects will be evinced by an electrical current flow detectable by any electrical current measuring device, well known in the art, placed in the circuit formed.

As the defect is repaired by the electrodeposition of polymer the electrical current flow diminishes and the resistance increases until the practical limits of the test and resistance measuring instrument are reached. Cables which are defect-free initially will be revealed by the absence of an electrical current flow and the immediate reading of a resistance beyond the required upper limits of the test.

Thus, in the former case this invention affords electrically conducting cables having discontinuous primary insulation and in the discontinuous areas of primary insulation a second insulation comprising electrodeposited carboxyl containing α-olefin polymer.

The invention is further described in the examples which follow wherein all parts and percentages are by weight unless otherwise specified.

Example 1

A No. 24 AWG copper wire insulated with polyethylene (8 mil wall, melt index of 0.2 dg./min.) was immersed in a 20% aqueous solution of a sodium salt of an ethylene/acrylic acid interpolymer containing 73% ethylene, 5% acrylic acid and 22% sodium acrylate interpolymerized therein. The copper wire was connected as an anode to the positive output terminal of a variable direct current source. A stainless steel 1000 cc. beaker, used to confine the aqueous salt solution, was connected as the cathode to the negative output terminal of the direct current source. A voltage of 150 volts D.C. was applied by closing the circuit. The resistance measured with an RCA Senior Volt Ohmyst WV–98 C was in excess of $1000 \times 10^6$ ohms. After 60 seconds the resistance reading was the same. This example served as the Control.

Example 2

Wire similar to that used in Example 1 was intentionally crushed in the jaws of a pair of pliers to develop defects or faults in the polyethylene insulation. No exposed copper wire was visible at the crushed sites. This wire was then subjected to the procedure described in Example 1. The resistance of the wire was initially only $14.5 \times 10^6$ ohms but after the circuit has been closed for 10 seconds the resistance had increased to greater than $1000 \times 10^6$ ohms.

Example 3

The procedure outlined in Example 2 was repeated. The resistance of the wire was initially $9.0 \times 10^6$ ohms but after the circuit had been closed for 10 seconds the resistance had increased to greater than $1000 \times 10^6$ ohms.

The data obtained in Examples 1–3 are delineated in Table I.

TABLE I

| Example | Resistance after a fault was made by crushing $R \times 10^6$ ohms | Deposition (repair) conditions | | Resistance after fault was repaired $R \times 10^6$ ohms |
|---|---|---|---|---|
| | | Volts | Time, seconds | |
| 1 (Control) | [1] 1,000 | 150 | 60 | 1,000 |
| 2 | 14.5 | 150 | 10 | 1,000 |
| 3 | 9.0 | 150 | 10 | 1,000 |

[1] Control, no fault made.

Examples 4–9

When the experiments described in Examples 1–3 are repeated but with ethylene-acrylic acid or ethylene-methacrylic acid interpolymer salts containing lithium, potassium, or ammonium cations instead of sodium cations, similar results are obtained.

Example 10

A telephone cable comprising 32 pairs of polyethylene insulated, #19 AWG copper wire encased in an outer aluminum sheath can be treated for defects or faults in the insulation of the wires by sealing one end of the cable, flooding the interior of the cable with water, connecting the bare end of one wire to the positive side of a 150 volt direct current source and the aluminum sheath to the negative side of the direct current source and closing the circuit. A resistance of about less than $1000 \times 10^6$ ohms indicates the presence of defects in the insulation of that wire. If the water is replaced by a 20% solution of an ethylene (73%)/acrylic acid (5%)/sodium acrylate (22%) interpolymer and the circuit closed, the resistance is greater than $1000 \times 10^6$ ohms after a few seconds even with wires previously shown to contain defects in the insulation. By shifting the contact from the positive side of the direct current source to each wire in turn, one at a time, the entire cable is rendered defect free. The defect free cable can then be purged free of salt with water and dried before use.

Example 11

For cables containing an insulating jacket between the wire bundles and the outer aluminum sheath, the procedure described in Example 10 can be duplicated by placing an uninsulated conducting lead, in the wire bundle, connected to the negative side of the direct current source in contact with the interior of the cable rather than in contact with the interior of the cable rather than in contact with the aluminum sheath.

Examples 12–19

When aqueous salt solutions containing potassium, lithium, trimethylammonium, or ammonium salts of ethylene-acrylic acid interpolymers, or sodium, potassium, lithium or ammonium salts of ethylene-methacrylic acid interpolymers are substituted for the polymer salt in Examples 10 and 11, similar results are obtained.

Although the invention has been described in its preferred forms with a certain degree of particularity, it is understood that the present disclosure has been made only by way of example, and that numerous changes can be made without departing from the spirit and scope of the invention.

What is claimed is:

1. Method for repairing defects in insulation of insulated electrical conductors which comprises:
   (a) contacting the insulated conductor at a point of insulation fault with a bath comprising an admixture of water and a salt of a carboxyl containing α-olefin polymer having monovalent cations, the α-olefin content of said polymer salt being at least 50 mole percent of the total polymer salt;
   (b) connecting said bath to ground;
   (c) connecting a direct current source in an electrical circuit containing the insulated conductor, bath, and ground, said insulated conductor being connected to the positive side of the direct current source; and
   (d) applying a voltage of at least about 5 volts D.C. for a length of time sufficient to electrodeposit carboxyl containing α-olefin polymer on the insulated conductor.

2. Method claimed in claim 1 wherein the α-olefin is ethylene.

3. Method claimed in claim 1 wherein the carboxyl containing α-olefin polymer salt contains up to 50 mole percent of an α,β-ethylenically unsaturated carboxylic acid having at least one carboxyl group.

4. Method claimed in claim 3 wherein the ethylenically unsaturated carboxylic acid is acrylic acid and the acrylic acid anions plus the cations comprise about 10 to 25 mole percent of the total olefin polymer salt.

5. Method claimed in claim 1 wherein the monovalent cations are $Na^+$.

6. Method claimed in claim 1 wherein the monovalent cations are $K^+$ cations.

7. Method claimed in claim 1 wherein the monovalent cations are $Li^+$ cations.

8. Method claimed in claim 1 wherein the monovalent cations are $(R)_3NH^+$ cations and each of R is selected from the group consisting of hydrogen and monovalent hydrocarbon radicals having up to 10 carbon atoms inclusive.

9. Method claimed in claim 1 wherein the insulated electrical conductors are contained within an outer sheath.

10. Method claimed in claim 9 wherein the outer sheath is an electrical conductor connected to ground.

11. Method claimed in claim 9 wherein an external lead is used to ground the bath.

12. Method claimed in claim 9 wherein the voltage is applied for at least 0.01 second.

13. Electrically conducting cable comprising at least one conductor, discontinuous primary insulation covering said conductor and a carboxyl containing α-olefin polymer electrodeposited in the discontinuous areas of said primary insulation.

References Cited

UNITED STATES PATENTS 2,478,322  8/1949  Robinson et al. _____ 204—181
2,530,366  11/1950  Gray _____ 204—181

HOWARD S. WILLIAMS, *Primary Examiner.*